Sept. 6, 1960  D. G. SMELLIE  2,951,560
FRICTIONAL DRAG APPARATUS AND BRAKE
PROVIDED THEREWITH
Filed Oct. 11, 1957

INVENTOR.
DONALD G. SMELLIE

BY

*R. L. Miller*
ATTORNEY

United States Patent Office 2,951,560
Patented Sept. 6, 1960

2,951,560

FRICTIONAL DRAG APPARATUS AND BRAKE PROVIDED THEREWITH

Donald G. Smellie, Canton, Ohio, assignor to The Goodyear Tire & Rubber Company, Akron, Ohio, a corporation of Ohio Filed Oct. 11, 1957, Ser. No. 689,629

6 Claims. (Cl. 188—73)

This invention relates to frictional drag apparatus for impeding movement of a rod in opposite axial directions and to a brake provided with an adjustment rod provided with such a frictional drag. While the frictional drag of the invention is especially useful in the automatic adjustment of disc brakes, the invention is also useful wherever it is desired to apply a frictional drag to a rod in opposite axial directions especially where it is desired to provide greater resistance to movement in one direction than in the opposite direction.

In brakes of the disc type where a disc is rotatably carried by a wheel and a stationary support straddles the disc and has a cylinder and piston for forcing a brake pad against one face of the disc and a stationary brake pad for engaging the opposite side of the disc, it has been proposed to provide for automatic adjustment of brake clearance. This has been done by mounting an adjusting rod axially of the brake cylinder, providing a brake return spring mounted under stress between a shoulder of the brake applying piston and a flange or shoulder of the adjusting rod, providing for engagement of the piston with the flange or shoulder of the adjustment rod to move the rod to a new position whenever brake applying movement of the piston exceeds the distance of normal brake clearance, and providing a friction grip or drag about the adjustment rod to hold it against movement under recoil of the return spring.

While such automatic adjustment devices have served the purpose of permitting step by step advance of the adjusting rod as wear of the brake resulted in excessive piston movement, thereby maintaining brake operation with minimum displacement of hydraulic operating fluid, it has been found that the cylinder support often becomes deflected under the braking load or other deflections take place falsely indicating need of rod adjustment and thereby causing overadjustment. Upon release of the brake so adjusted, the deflected parts recover and brake clearance disappears with possible grabbing of the brake or at least occasional frictional contact and noise. Also in use the brake disc becomes heated to such an extent as to warp and dish so as to at least occasionally contact the brake shoes.

The present invention provides a frictional drag sufficient to hold the adjustment rod against axial movement toward the brake disc under tension of the piston return spring alone and to permit its adjusting movement in that direction under the superior pressure of hydraulic fluid against the piston, while at the same time the adjustment rod may be retracted against only slight resistance of the frictional drag when necessary as when overadjustment has taken place so that the brake may free itself and nevertheless the rod is under enough frictional drag in either direction at all times to prevent displacement of the adjusting rod by mere vibration of the mechanism.

Objects of the invention are to provide a frictional drag for a rod which will apply a drag in opposite axial directions and to provide frictional drag of heavy nature against movement in one direction and lighter drag in the opposite direction.

Other objects are to provide for varying the initial tension of the spring members and to provide for adjusting their angular position to each other.

These and other objects will be apparent from the following description and the accompanying drawings.

Figure 1:
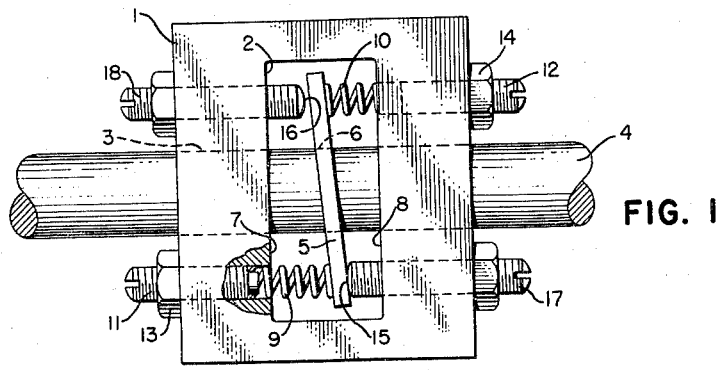
Fig. 1 is a side view of one embodiment of the invention as applied to a rod of round cross section, a portion thereof being broken away to show the screw adjustment.

Referring first to Fig. 1, this shows a metal block 1 having a rectangular opening 2 therethrough. A round bore 3 extends through the block across the opening for receiving a round rod 4. A pawl 5 is provided in the form of a relatively thin disc of metal having a central aperture 6 slidably fitting the rod 4.

The rectangular block provides oppositely facing abutment surfaces 7 and 8 substantially parallel to the faces of the pawl. A coil spring 9 is mounted with one end abutting the pawl 5 and the other end abutting the abutment 7 at a position radial of the axis of the rod 4. A second coil spring 10 is similarly mounted between the opposite side of pawl 5 and the opposite abutment 8, the springs being at positions 180 degrees apart relative to the axis of the rod.

For adjusting the springs 9, 10, their ends adjacent the abutment surfaces may be seated on adjusting screws 11, 12 respectively mounted in threaded openings through the block. These screws may be locked in adjustment by jamb nuts 13, 14.

The springs 9 and 10 may preferably be of different resistances to deflection and as illustrated the spring 9 is relatively stiff and the spring 10 is relatively weak. The rod 4 and the pawl disc 5 are made of hardened steel so as not to lose their shapes.

Fulcrums 15, 16 are provided on the abutments 8 and 7 and may be in the form of adjustable screws 17, 18 projecting toward the pawl disc at positions directly opposite springs 9 and 10. A slight clearance should exist between the pawl disc and one of the fulcrums such as 16 in the locked position of the pawl disc.

If the rod 4 is moved axially to the left in Fig. 1 the pawl disc 5 being locked to the rod by the forces of the compressed springs 9 and 10, the movement will at first be opposed by the stronger spring 9 and assisted by the weaker spring 10, the opposing force being equal to the difference of the two spring forces. Upon contact of the pawl disc with fulcrum 16, the disc is moved about the fulcrum in a clockwise direction with further compression of spring 9. Compression of spring 9 is accomplished with gradually increasing force which is balanced against friction due to binding of the pawl disc on the rod. The rod is therefore impeded against movement in this direction quite strongly.

If the rod 4 is moved axially to the right in Fig. 1, the force opposing such movement to the rod and the pawl locked thereto is the weaker spring 10, the spring 9 being opposed by fulcrum 15. The pawl disc may swing about the fulcrum 15 until friction of pawl disc to rod 4 is no greater than the force of the weak spring 10.

The screws 11, 12 may be adjusted to change the tension of springs 9 and 10. The screws 17, 18 may be adjusted to change the clearance. Some clearance of the fulcrum is always desirable to assure locking of the pawl disc and the rod.

Figure 2:
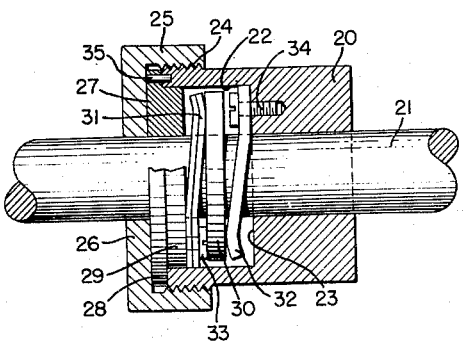
Fig. 2 is an axial sectional view of another embodiment of the invention as applied to a rod of round cross section, the rod being broken away in part.

In the embodiment of Fig. 2, one member 20 for slidably supporting a rod 21 is counterbored to provide a cavity 22 terminating in an abutment 23. The member 20 has a threaded margin 24 for engaging a threaded skirt 25 of a cap member 26. A second support member 27 is mounted between member 20 and its cap 26 and has a flange portion 28 adapted to be clamped therebetween and a portion 29 of reduced diameter fitting said counterbore.

The pawl disc 30 is of hardened steel and has an aperture closely fitting the rod 21 within the counterbore. The disc is slightly smaller in diameter than the counterbore. The springs 31, 32 are annular discs bowed to generally a reversely curved shape in cross section. The spring 31 is of relatively low strength and is secured to support member 27 at one position by a screw 33. It springs outwardly from its support to engage the pawl at a position diametrical of the screw 33. The spring 32 is of greater strength and is secured by a screw 34 to the abutment wall 23 of the member 20. Means, such as a pin 35 may be provided to lock the support member 27 against rotation relative to support member 20. The pin is mounted on flange 28 and engages a dowel hole in the member 20. The springs 31, 32 are so arranged that they impinge against the pawl disc at diametrically opposite positions. The support member 20 may have a plurality of dowel holes provided therein for locking the support members at a number of positions in which the spring members impinge the disc at different angles and therefore modify each other's action thereby serving as an adjustment. The screws 33, 34 may have raised heads adapted to act as fulcrums upon contact of the pawl disc therewith. Some clearance should be provided between the head of screw 34 and the pawl disc to insure gripping. Each spring may have a multiplicity of leaves if desired.

Figure 3:
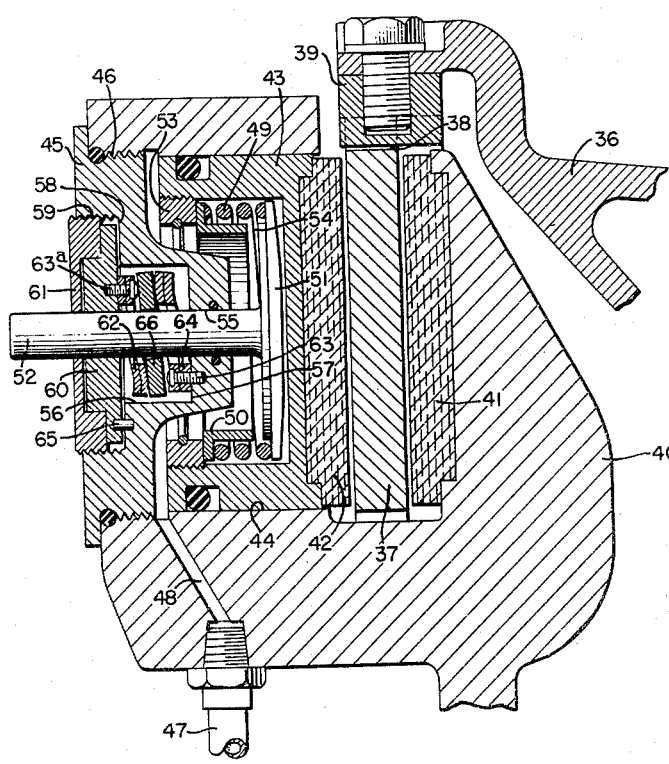
Fig. 3 is a cross sectional view of a disc brake showing the invention applied to the adjusting rod thereof.

Fig. 3 illustrates the invention as applied to a disc brake. In this figure the numeral 36 designates a wheel such as the landing wheel of an airplane, rotatably mounted on bearings for rotation about a non-rotatable axle (not shown). The wheel 36 carries a rotatable brake disc 37 having notches 38 at spaced intervals about its periphery to engage keys 39 secured to the wheel. The arrangement is such that the disc may float axially of the wheel but is rotatably driven thereby.

Mounted on the fixed axle is a non-rotatable support 40. The support is bifurcated to provide an outwardly open slot for receiving the brake disc 37. A fixed brake pad or shoe 41 of friction material is removably secured to one arm of the support. A second brake pad or shoe 42 is removably secured to a piston 43 fitted in a cylinder 44 formed in the opposite arm of the support. The head end of the cylinder 44 is closed by a head 45 engaging threads 46 of the cylinder. A fluid pressure connection 47 supplies hydraulic pressure to the cylinder 44 through a passage 48. The arrangement is such that pressure in cylinder 44 moves piston 43 and shoe 42 into engagement with disc 37 which engages dics 37 with shoe 41 applying the brake.

To release the brake when hydraulic pressure is discontinued, a coil spring 49 is mounted between a stop ring 50 and a flange 51 of an adjusting pin 52, the stop ring 50 being seated upon a threaded ring 53 adjustably secured to the skirt of the piston 43. The ring 53 is adjusted to provide a clearance space 54 between the stop ring 50 and the flange 51, equal to the desired brake clearance in the retracted position of the piston illustrated in Fig. 3, where clearance is shown between the shoes 41, 42 and the disc.

Should the brake shoes or the disc wear away so as to increase brake clearance, more displacement of the brake piston would be necessary to apply the brake requiring undesirable greater supply of fluid under pressure. To avoid this, it has been proposed to mount the adjusting pin 52 frictionally in the head 45 so that the recoil spring 49 is not strong enough to change the adjustment but the hydraulic pressure against piston 43 is great enough to move the adjusting pin toward the brake disc to a new position whenever stop ring 50 impinges against flange 51 during a brake-applying movement.

In the use of such frictional devices as have heretofore been proposed for holding the adjusting pin, it has been found that sometimes the support 40 is so deflected under brake pressure, or the brake disc becomes distorted in such manner as to give a false indication of excessive brake clearance, resulting in overadjustment of the pin. Upon release of hydraulic pressure after such overadjustment, the brake may not be fully released and heating, drag, and noisy operation result. This is due to the fact that the friction holding means for the adjusting pin heretofore proposed have required an equal force to move the pin in either direction.

To provide for so holding the adjusting pin as to permit movement toward the brake disc under hydraulic pressure of the cylinder but not under pressure of the recoil spring while permitting movement of the adjusting pin in a direction away from the brake disc under very slight force and thereby to prevent engagement of the brake due to overadjustment, a frictional drag such as previously described may be mounted about the adjusting pin. For this purpose, the head 45 is formed with a central bore 55 for slidably guiding the rod 52 and a counterbore 56 having a flat bottom providing an abutment 57. A second counterbore 58 of increased diameter, and internally threaded as at 59, is also formed in the head. A second support 60 in the form of a flanged disc is held in the counterbore 58 by a threaded cover 61. The support 60 has a spring member 62 secured thereto by a screw 63a. A second spring member 64 is secured to the abutment 57. These springs are each of one or more leaves of annular disc type bowed to reversely curved form in one diametrical section and are similar to the springs of Fig. 2. The springs are mounted at diametrically opposite positions and the support 60 is held in properly oriented position by a dowel pin 65 entering a dowel hole in the cylinder head.

The spring member 62 is relatively weak as compared to the spring member 64. A pawl disc 66 has a central aperture slidably fitting the adjusting pin 52 and both it and the pin are of hardened steel. The springs 62, 64 impinging against opposite sides of the pawl disc at opposed angular positions provide a couple tending to cause the pawl to bind on the pin. The resistance to movement of the adjusting pin axially is, however, different in opposite directions due to the effect of the springs of different strength. The heads of the screws 63, 63a may be made to project toward the pawl disc to act as fulcrums for the pawl disc. Some clearance between the head of screw 63 and the pawl disc in its locked position should be provided to insure frictional drag.

By design of the respective springs as to strength, by their oriented adjustment, and by adjustment of clearance space at the fulcrum points, the frictional drag may be made to resist strongly movement of the adjusting pin toward the brake disc and to resist only slightly movement of the pin in the reverse direction.

While certain representative embodiments and details have been shown for the purpose of illustrating the invention, it will be apparent to those skilled in the art that various changes and modifications may be made therein without departing from the spirit or scope of the invention.

I claim:

1. A frictional drag apparatus for impeding movement of a rod in opposite axial directions, said apparatus comprising a pair of spaced apart abutments having aligned bores for slidably guiding a rod, one of said abutments being rotatable about the axis of the rod relative to the other abutment, a pawl located in the space between said abutments, said pawl comprising an apertured disc closely surrounding the rod and thinner than said space, a first spring means seated on one abutment and contacting said pawl under tension only at a position radially outward of said rod, a second spring means seated on the opposite abutment and contacting said pawl under tension only at a position radially outward of said rod, and the positions of contact of said first and second spring means with said pawl being spaced circumferentially about the axis of the rod from one another, said spring means each comprising a spring metal annular disc having an aperture to clear said rod, said disc being bowed in section diametrically in one direction and secured at one position of its margin to the adjacent abutment and sprung free of the abutment at an opposite position, and means for locking said abutments in a plurality of positions relative to each other rotatively to adjust the action of said springs.

2. A frictional drag apparatus for impeding movement of a rod in opposite axial directions, said apparatus comprising a pair of spaced apart abutments having aligned bores for slidably guiding a rod, a pawl located in the space between said abutments, said pawl comprising an apertured disc closely surrounding the rod and thinner than said space, a first spring means seated on one abutment and contacting said pawl under tension only at a position radially outward of said rod, a second spring means seated on the opposite abutment and contacting said pawl under tension only at a position radially outward of said rod, the position of contact of said first and second spring means with said pawl being spaced circumferentially about the axis of the rod from one another, and means for adjustably and determinately positioning said spring means relative one to another circumferentially of the axis of said rod.

3. A brake of the disc type having a rotating disc, a support adjacent the disc formed with a cylinder, a piston movable in said cylinder toward and from the disc for advancing a brake shoe into frictional engagement therewith, an adjusting rod extending axially of said cylinder, a return spring mounted between a shoulder of said piston and a flange of the adjusting rod for returning said piston to a normal brake clearance position, a shoulder on said piston for engaging the flange of said adjusting rod under over-normal brake application movement to advance the adjusting rod to a new position, and a single friction drag means engaging said adjusting rod and offering high frictional resistance to advance of said adjusting rod toward the new position during a brake application movement and offering less resistance to a retractive movement of said adjusting rod during a brake releasing movement in the opposite direction, said friction drag means comprising a thin annular pawl disc having a central aperture adapted to slidably receive said adjusting rod, means slidably supporting said adjusting rod for axial movement, and spring means arranged to abut opposite sides of said pawl disc under tension at positions angularly spaced from one another about the axis of said adjusting rod.

4. A brake of the disc type having a rotating disc, a support adjacent the disc formed with a cylinder, a piston movable in said cylinder toward and from the disc for advancing a brake shoe into frictional engagement therewith, an adjusting rod extending axially of said cylinder, a return spring mounted between a shoulder of said piston and a flange of the adjusting rod for returning said piston to a normal brake clearance position, a shoulder on said piston for engaging the flange of said adjusting rod under over-normal brake application movement to advance the adjusting rod to a new position, and friction drag means engaging said adjusting rod and offering high frictional resistance to advance of said adjusting rod toward the new position and offering less resistance to a retractive movement of said adjusting rod in the opposite direction, said friction drag means comprising a thin annular pawl disc having a central aperture adapted to slidably receive said adjusting rod, means slidably supporting said adjusting rod for axial movement, and spring means arranged to abut opposite sides of said pawl disc under tension at positions angularly spaced from one another about the axis of said adjusting rod, said supporting means each having a fulcrum for engaging a portion of the pawl disc at a position opposite to the position of contact with one of said spring means, and one of said fulcrums being spaced from said pawl in the locked position of said rod and pawl.

5. A disc brake having a rotating brake disc, a cylinder and piston for advancing a friction pad against a side of the brake disc to apply braking pressure thereto, a spring for returning said piston to a brake clearance position, a stop pin slidably mounted in a bare coaxial of said cylinder and having a shoulder adapted to be engaged by said piston during advance of said piston by an excessive amount in a direction towards said disc, and friction means retained by said cylinder adapted to offer high resistance to movement of said stop pin toward said brake disc and low resistance to movement thereof in the opposite direction, said friction means comprising a thin annular pawl disc having a central aperture adapted to slidably fit about said stop pin between spaced apart abutment walls of the head of said cylinder, and relatively strong and weak spring means at opposite sides of said pawl disc having different resistances to deformation and bearing upon said abutments, the relatively strong spring being mounted at the side of said pawl disc facing the brake disc and the relatively weak spring at the opposite side of the pawl disc to provide high frictional drag against movement of the stop pin in a direction of brake application and low frictional drag to movement of said pin in the opposite or brake releasing direction whereby overadjustment of the adjusting pin during brake application may be corrected by retraction of the pin under slight force.

6. A disc brake as defined by claim 5 in which one of spaced apart abutment walls of the head of said cylinder is rotatably adjustable relative to the other abutment wall to adjust the positions of said spring means.

References Cited in the file of this patent

UNITED STATES PATENTS

| | | |
|---|---|---|
| 836,303 | Christensen | Nov. 20, 1906 |
| 1,944,116 | Stratman | Jan. 16, 1934 |
| 2,244,084 | Saenger | June 3, 1941 |
| 2,294,516 | Smith | Sept. 1, 1942 |
| 2,392,970 | Bricker | Jan. 15, 1946 |
| 2,551,252 | Du Bois | May 1, 1951 |
| 2,568,858 | Kovac | Sept. 25, 1951 |
| 2,579,305 | Cushman | Dec. 18, 1951 |
| 2,727,534 | Briede | Dec. 20, 1955 |

FOREIGN PATENTS

| | | |
|---|---|---|
| 519,118 | Great Britain | Mar. 18, 1940 |